United States Patent [19]

Cross

[11] 4,195,944

[45] Apr. 1, 1980

[54] FRICTIONAL COUPLINGS

[76] Inventor: Michael Cross, 52 Bloomfield Ave., Bath, Avon, England

[21] Appl. No.: 842,104

[22] Filed: Oct. 14, 1977

[30] Foreign Application Priority Data

Oct. 16, 1976 [GB] United Kingdom ............... 43077/76

[51] Int. Cl.² .............................................. F16B 21/18
[52] U.S. Cl. ....................................... 403/326; 85/8.8; 403/372
[58] Field of Search ................. 403/DIG. 6, 326, 372, 403/320, 334, 156; 85/8.8; 151/69

[56] References Cited

U.S. PATENT DOCUMENTS

| 1,569,718 | 1/1926 | Colley | 403/156 |
| 1,572,770 | 2/1926 | Colley | 151/69 |
| 1,970,078 | 8/1934 | Dillon | 151/69 X |
| 2,987,349 | 6/1961 | Kretzmer, Jr. | 308/72 |
| 3,137,336 | 6/1964 | Wing | 85/8.8 X |

Primary Examiner—Andrew V. Kundrat
Attorney, Agent, or Firm—Emory L. Groff, Jr.

[57] ABSTRACT

A frictional coupling for a male member inserted in the bore of a female member, to couple together the two members when at a pre-determined axial position. The opposed surfaces of the male and female members define a clearance the radial dimension of which varies as the members are moved axially relative to one another. A frictional coupling element is provided in said clearance, which element comprises a strip of resilient material preformed to a polygonal shape such that the outer corners contact the bore of the female member and the inner flats contact the male member.

As the clearance is reduced by relative axial movement of the members, the element is deformed to restrain further movement therebetween.

14 Claims, 5 Drawing Figures

FRICTIONAL COUPLINGS

BACKGROUND OF THE INVENTION (a) Field of the Invention

This invention relates to improvements in couplings. More particularly, the invention concerns friction-couplings adapted to resist and so far as possible to prevent relative rotational movement between a rotatable male member, such for instance as a shaft, and a bore in a female member within which it is axially movably located, such for instance as a bore in a housing, a cylinder, a bearing, an annulus of indeed other member capable of receiving such a male member.

(b) Description of the Prior Art

Hitherto, friction-locking or friction-coupling devices have mostly been associated with the threaded portion of male and female members joined together by screw-threading, because of the difficulty in producing an effective friction-coupling between such members at non-threaded positions. Such an arrangement however not only restricts the location of the coupling device and introduces problems such as burring of the threads, but also the friction-coupling then must be precisely machined to fine tolerances so as to enable it to be properly located, and yet even then problems can still arise in locating the coupling. A friction-locking device has however been proposed in British Pat. No. 1,393,257 which takes the form of an imperfect circle or ring, which is adapted to be interposed between rotatable members being coupled, and which holds or couples these members together frictionally through imperfections in the circle that provide points of frictional contact therewith.

OBJECTS OF THE INVENTION

It is the principal object of the present invention to provide an improved and simplified construction of coupling for interfitting male and female members, which will enable the male and female members to be friction-coupled together more effectively than hitherto.

It is another object of the invention to allow male and female members to be frictionally coupled together at non-threaded portions thereof. A further object is to provide a coupling, the component parts of which do not need machining to fine tolerances in order to obtain a reliable frictional coupling.

SUMMARY OF THE INVENTION

In accordance with these and other objects, this invention provides a coupling assembly which comprises in combination a female member including an axially-extending bore, a male member for coupling therewith positioned axially within the bore in said female member but spaced therefrom at least partially by a clearance between inner surfaces of the bore in the female member and outer surfaces of the male member and movable axially and except when coupled therewith rotatable relative thereto; and a generally-annular band-shaped frictional coupling member embracing the male member and accommodated within said clearance, said frictional coupling member being of substantially-regular polygonal shape in a plane normal to the common axis of the female and male members, the opposed outer surfaces of the male member and inner surfaces of the female member being so formed that the clearance between them varies as the male and female members are moved axially relative to each other between a non-threaded low-clearance location where the frictional coupling member is forced into frictional engagement with the opposed surfaces of both the male and female members, the external corners of the polygonally-shaped frictional coupling member then bearing upon the inner surfaces of the female member, so as thus frictionally to restrain relative rotational movement between the male and female members, and a high-clearance location where the frictional coupling member is not in frictional engagement with at least one of said male and female members.

BRIEF DESCRIPTION OF THE DRAWINGS

The invention will now be described in greater detail and certain preferred aspects and embodiments thereof given, reference being made to the accompanying drawings, in which.

DESCRIPTION OF THE PREFERRED EMBODIMENTS

Figure 1:
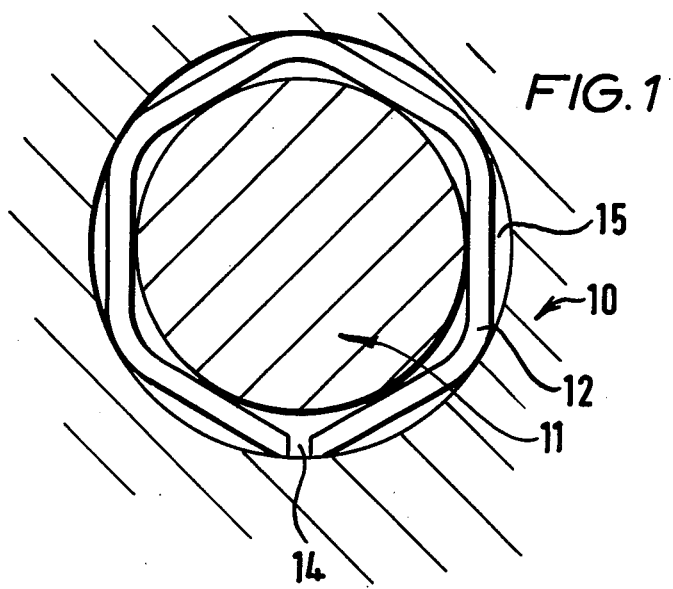
FIG. 1 shows an end-elevational view, partly in cross-section, of one preferred embodiment of coupling assembly in accordance with the invention, in which a generally hexagonal band-shaped frictional coupling member is accommodated in the clearance between a bore in the female member and a shaft serving as the male member of the coupling assembly.
Figure 2:
FIG. 2 shows a plan view of the band-shaped frictional coupling member of FIG. 1.

In the coupling of this invention, the opposed surfaces of the male and female members which are to be frictionally-coupled together are so formed and arranged that the clearance between them varies according to predetermined axial positions of these members relative to each other; and the band-shaped friction coupling member, which is interposed in the clearance between them, is adapted to become operative by frictionally-engaging the opposed surfaces of the male and female members when the axial adjustment between them has created a low-clearance at the location of the friction coupling member, whereby the coupling member is forced into frictional engagement with both the male and female members.

The friction coupling member is interposed in the clearance between the male and female members at non-threaded parts thereof (whether there is a screw-threaded union between them elsewhere, or not) with the external corners of the polygon facing towards the female member and, at the low-clearance location, bearing against and frictionally engaging with it.

This invention is not primarily concerned with the means by which the male and female members may be adjusted axially relative to each other. It may however be noted that such adjustment may conveniently be achieved by providing both the inner surfaces of the bore in the female member and the outer surfaces of the male member with screw-threaded portions which are threadedly interengaged, and then the band-shaped friction coupling member is so disposed between the opposed non-threaded surfaces of the male and female members that it is forced into frictional engagement therewith as the threaded portions of the male and female members are screwed into engagement with each other.

In order to facilitate assembly and disassembly of the coupling, it is usually advantageous if at least one and preferably both of the opposed surfaces of the male member and female member tapers in diameter between the high-clearance location and the low-clearance location. For the same reason, it may also be advantageous if elsewhere than at the low-clearance location the diameter of the bore in the female member is increased relative thereto, and/or the diameter of the male member is reduced relative thereto.

It will be appreciated that the band-shaped frictional coupling member, which is formed of any suitable material such for instance as steel or an alloy having similar characteristics, must be generally-annular so that it may embrace the male member and be accommodated in the clearance between the male member and the bore in the female member, but in the plane normal to the axis of the male and female members it is of substantially regular polygonal shape. The invention has been made to work with coupling members having as few as three sides, and where the coupling assembly includes very large-sized male and female members it is possible and may be advantageous to use polygonal coupling members with a great many sides. However for the majority of moderately-sized coupling assemblies the polygonal shape should preferably be that of a regular polygon having 5-8 sides, and usually most conveniently one having 6 sides.

While the use of round-section wire to form the band-shaped friction coupling member is not wholly excluded from this invention it has been found difficult to secure a sufficient frictional load with round-section wire without causing deformation thereof sufficient to impair its strength. It is therefore a greatly preferred feature of this invention to employ a band-shaped friction coupling member of non-circular section, preferably either substantially square or rectangular in cross-section, wherein conveniently the greater cross-sectional dimension lies substantially parallel to the common axis of the male and female members.

The friction coupling member need not necessarily be held in any fixed position upon either the male or the female member, provided that one or both these members are so tapered or otherwise shaped that upon relative axial adjustment they will clamp the friction coupling member therebetween.

It is however generally preferred that means should be provided for retaining the friction coupling member at a substantially fixed position relative either to the male member or to the female member. Such retaining means can for instance be circlips, retaining rings or other mechanically-equivalent arrangements such as a counterbore, or spigot, with a washer suitably mounted thereon, for example by means of screws.

The retaining means for the friction coupling member will however preferably be a groove or recess formed in either the inner surfaces of the female member or the outer surfaces of the male member, in which the friction coupling member is mounted.

In that case, so as to enable it to be conveniently mounted in the groove, the friction coupling member will advantageously be formed of a resiliently-deformable material are provided with a gap therein, so that it may be resiliently deformed for purposes of mounting it in said groove.

The friction coupling member has of course inner and outer faces, for engagement at the low-clearance location respectively with the male member and with the female member. So as to assist in providing a smooth assembly, particularly along the taper when the male and/or female members taper at the low-clearance location, the relevant face or faces of the friction coupling member can very advantageously be pre-formed with a suitable cross-sectional profile, which both facilitates assembly and disassembly of the coupling and also promotes frictional inter-engagement between the friction coupling member and the male and/or female member as the case may be.

Figure 3:
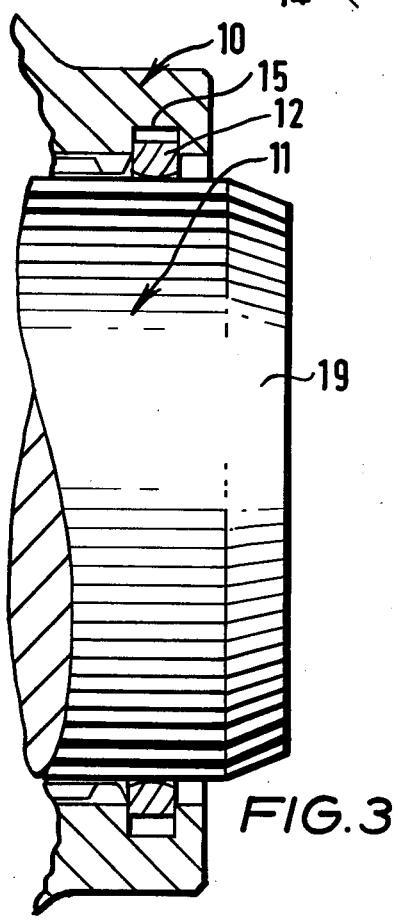
FIG. 3 shows a side-elevational view of the coupling assembly of FIG. 1, illustrating the accommodation of the band-shaped frictional coupling member within a groove formed in the inner bore surfaces of the female member of the assembly.

Referring to FIGS. 1 to 5 of the drawings, the coupling of the invention comprises a female member 10, having a bore therein, and a male member 11, e.g. a shaft, with a clearance therebetween. Accommodated in the clearance between the bore 10 and the shaft 11 is a generally annular, band-shaped coupling member 12, shown as having a generally hexagonal shape (in the plane normal to the common axis of the male and female members) but with a gap 14 therein, which enables the coupling member 12, which is formed of resiliently-deformable steel or like material, to be deformed and mounted within a groove in either the female member 10 or the male member 11, such as the groove 15 in the female member 10 as shown in FIG. 3. The band-shaped coupling member 12 is substantially square in cross-section as shown in FIGS. 2-5, but may take other substantially rectangular cross-sectional forms. The coupling member 12 is so dimensioned that when the male member 11 and the female member 10 are axially adjusted to the low-clearance location they will be firmly engaged frictionally by the coupling member 12. When it is mounted in a groove in the female member 10, as shown for instance in FIGS. 3 and 4, the coupling member 12 should preferably engage the female member 10 at each of its corners, and must also be so dimensioned that is is capable of gripping the male member 11 at the low-clearance location after the male member 11 has been correctly adjusted axially relative to the female member 10.

Although not shown in the drawings, the male member 11 and the female member 10 can often with advantage be united elsewhere by a screw-threaded union; and then the band-shaped coupling member 12 is so dimensioned and arranged that it is forced into frictional engagement with non-threaded opposed surfaces of male member 11 and female member 10 as the threaded portions thereof are screwed together. This may be achieved, for example, by suitably tapering, or by varying the diameters, of the male member 11 and female member 10.

Figure 5:
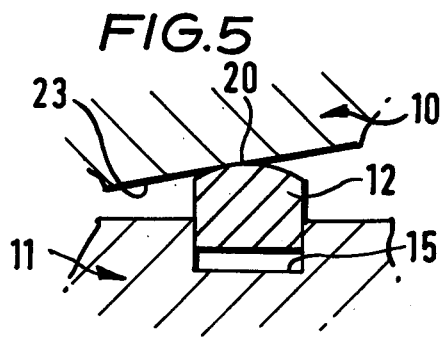
FIG. 5 shows a similar cross-sectional view of part of yet another preferred embodiment of band-shaped frictional coupling member, again accommodated between the male and female members of the coupling assembly, but which illustrates the preformed profile imparted to the other face of the coupling member.

Likewise, where as shown for instance in FIG. 5 the band-shaped coupling member 12 is located in a groove 15 in the male member 11 it is so dimensioned and arranged that as the male member 11 and female member 10 are moved axially relative to one another the coupling member 12 is forced into frictional engagement therewith, in such a way that all the corners of the polygonal coupling member 12 engage frictionally with the female member 10 at the low-clearance location. This is ensured by suitably tapering, or otherwise varying, the respective diameters of the male and female members, and thus the clearance therebetween.

At points other than the low-clearance location the diameters of the bore in the female member and of the male member may be varied as desired. Thus on the one hand both members may have essentially the same diameter, so that there is a sliding fit between them, or on the other hand the diameter of the bore may be increased and that of the male member 11 may be decreased so as to facilitate assembly of the coupling. For the same purpose the end or some other selected part of the male member 11 may be tapered, as shown for instance at 19 in FIG. 3.

Figure 4:
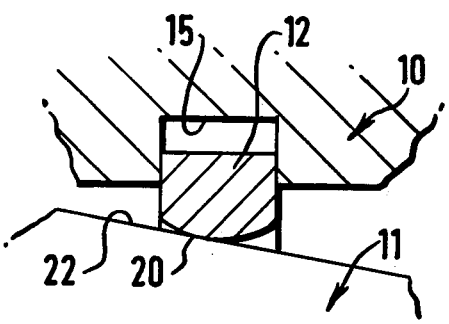
FIG. 4 shows a cross-sectional view of part of another preferred embodiment of band-shaped frictional coupling member, accommodated between the male and female members of the coupling assembly, which illustrates the preferred profile imparted to one face of the coupling member.

Referring now more particularly to FIGS. 4 and 5 of the accompanying drawings, the band-shaped coupling member 12 retained in the groove 15 in the female member 10 may have a preformed profile imparted to its inner face which is adapted to engage the outer surfaces of the male member 11, as shown in FIG. 4 at 20 (see also FIG. 3); and the coupling is then assembled by sliding or otherwise axially moving the profiled face 20 of the coupling member 12 along a tapered portion 22 of the male member 11. Alternatively, as shown in FIG. 5, the band-shaped coupling member 12 may be retained in groove 15 in the male member 11, with a preformed profile imparted to its outer face which is adapted to engage the inner surfaces of the bore in the female member 10; and the coupling is then assembled by sliding the profiled face 20 along a tapered portion 23 of the female member 10.

I claim:

1. A coupling assembly which comprises in combination a female member including an axially-extending bore, a male member for coupling therewith positioned axially within the bore in said female member but spaced therefrom at least partially by a clearance between inner surfaces of the bore in the female member and outer surfaces of the male member which clearance is greater than that required for the male member to move within the female member, the male member being movable axially and except when coupled with the female member rotatable relative thereto, and a generally-annular band-shaped friction coupling member formed of a metal alloy, having inner and outer faces, embracing the male member and accommodated within said clearance but protruding therefrom, said friction coupling member being of substantially regular polygonal shape in the plane normal to the common axis of the female and male members and of quadrilateral cross-section, said coupling member outer face formed with a rounded profile in cross-section, the opposed outer surfaces of the male member and inner surfaces of the female member being so formed that the clearance between them varies as the male and female members are moved axially relative to each other between a non-threaded low-clearance location where the respective inner and outer faces of the friction coupling members are forced into frictional engagement with the opposed surfaces of both the male and female members, the external corners of the outer face of the polygonally-shaped friction coupling member then bearing upon the inner surfaces of the female member, so as thus frictionally to restrain restrain relative rotational movement between the male and female member and a high-clearance location where the friction coupling member is not in frictional engagement with at least one of said male and female members.

2. A coupling assembly as claimed in claim 1, in which both the inner surfaces of the bore in the female member and the outer surfaces of the male member include screw-threaded portions which are threadedly inter-engaged, and said generally-annular, band-shaped friction coupling member is so disposed between the opposed non-threaded surfaces of the male and female members that it is forced into frictional engagement therewith as the threaded portions of the male and female members are screwed into engagement with each other.

3. A coupling assembly as claimed in claim 1, in which at least one of the internal surface of the female member and the external surface of the male member is so tapered in diameter between the high-clearance location that the clearance between the male and female members diminishes with axial movement towards the position of frictional engagement.

4. A coupling assembly as claimed in claim 3, in which the diameter of the bore in the female member is less at the low-clearance location than at the high-clearance location thereof.

5. A coupling assembly as claimed in claim 3, in which the diameter of the male member is greater at the low-clearance location than at the high-clearance location thereof.

6. A coupling assembly as claimed in claim 1, in which the generally-annular, band-shaped friction coupling member is substantially a regular polygon having from 5 to 8 sides.

7. A coupling assembly as claimed in claim 6, in which the coupling member is substantially a regular hexagon.

8. A coupling assembly as claimed in claim 1, in which the material forming said band-shaped friction coupling member is of substantially square or rectangular cross-section.

9. A coupling assembly as claimed in claim 8, in which the material forming said band-shaped friction coupling member is of substantially rectangular section, and the greater cross-section dimension thereof lies substantially parallel to the common axis of the male and female members.

10. A coupling assembly as claimed in claim 1, in which means are provided for retaining the friction coupling member at a substantially fixed position relative to only one of the male member and the female member.

11. A coupling assembly as claimed in claim 10, in which the retaining means for the band-shaped friction coupling member takes the form of a groove provided in one of the inner surface of the bore of the female member and the outer surface of the male member.

12. A coupling assembly as claimed in claim 11, in which the band-shaped friction coupling member is formed of a resiliently deformable material and with a gap therein, whereby the member may be resiliently deformed for mounting in said groove.

13. A coupling assembly as claimed in claim 1, in which at least one of the inner and outer faces of the friction coupling member is preformed with a cross-sectional profile to facilitate frictional engagement between said face and the surface of the opposed male or female member.

14. A coupling assembly which comprises in combination a female member including an axially-extending bore, said bore being screw-threaded for part of the length thereof, a male member screw-threaded for part of the length thereof, the screw-threaded parts of said male and female members being inter-engaged and the non-screw-threaded parts of said male and female members defining an annular clearance of tapering radial dimension such that the clearance between the male and female members diminishes with axial movement towards the position of frictional engagement, a circumferential groove provided in the non-screw-threaded part of one of the external surface of the male member and the internal surface of the female member, a friction coupling member located in said groove but protruding therefrom, the friction coupling member comprising a strip of resilient material of generally rectangular cross-section preformed to define a polygonal element when viewed in a plane normal to the common axis of said male and female members and having an outer face which is rounded in cross-section, the external corners of which contact the female member and the internal flats of which contact the male member whereby the frictional coupling element frictionally connects the male member to the female member as the clearance between the non-screw-threaded parts of the male and female members is reduced by threading of one member relative to the other member.

* * * * *